United States Patent [19]

Yamamoto et al.

[11] Patent Number: 5,198,518
[45] Date of Patent: Mar. 30, 1993

[54] PREPARATION OF POLYORGANOSILOXANE RESINS

[75] Inventors: Kenji Yamamoto; Ken-Ichi Isobe, both of Annaka, Japan

[73] Assignee: Shin-Etsu Chemical Company, Ltd., Tokyo, Japan

[21] Appl. No.: 791,673

[22] Filed: Nov. 14, 1991

[30] Foreign Application Priority Data

Nov. 15, 1990 [JP] Japan .................................. 2-309533

[51] Int. Cl.$^5$ ............................................. C08G 77/06
[52] U.S. Cl. ......................................... 528/12; 528/10; 528/14
[58] Field of Search ............................... 528/12, 14, 10

[56] References Cited

U.S. PATENT DOCUMENTS

| | | | |
|---|---|---|---|
| 4,625,011 | 11/1986 | Kosal et al. | 528/14 |
| 4,722,987 | 2/1988 | Ikeno et al. | 528/23 |
| 4,766,192 | 8/1988 | Gvozdic | 528/14 |
| 4,888,405 | 12/1989 | Gamon et al. | 528/23 |

Primary Examiner—John C. Bleutge
Assistant Examiner—M. W. Glass
Attorney, Agent, or Firm—Millen, White, Zelano and Branigan

[57] ABSTRACT

Polyorganosiloxane resins are prepared through the hydrolytic condensation of organoalkoxysilanes and/or oligomers thereof. By adding a low volatile, weakly acidic compound to the reaction mixture for adjusting the reaction mixture to pH 2-5, the alcohol by-product can be distilled off from the reaction mixture without altering the polyorganosiloxane resins.

5 Claims, No Drawings

PREPARATION OF POLYORGANOSILOXANE RESINS

This invention relates to a method for preparing a polyorganosiloxane resin through the hydrolytic condensation of an organoalkoxysilane and/or an oligomer thereof.

BACKGROUND OF THE INVENTION

One typical prior art method for preparing polyorganosiloxane resins is by hydrolytic condensation of organohalogenosilanes. Reaction control is difficult since organohalogenosilanes are highly reactive. To produce a polyorganosiloxane resin having desired properties, it is necessary to use a vast volume of solvent or water or even harmful solvents such as trichloroethylene. Hydrohalogenic acid by-products and disposal of organic waste water are outstanding problems.

Another known method is by hydrolytic condensation of organoalkoxysiloxanes. This method is easy in reaction control and thus advantageous over the former method starting with organohalogenosilanes. A problem arises with a large amount of alcohol by-products. When the reaction is terminated by water washing, there is left a large amount of alcoholic waste water.

As a solution to this problem, it is known in the art to remove the alcohol by-product by distillation. However, if distillation takes place without removing or deactivating the hydrolytic condensation catalyst, silanol groups often undergo condensation to form a gel. Therefore, the polyorganosiloxane resins that can be produced in a stable state by this method are limited to those having only alkoxy groups as a functional group and a relatively low molecular weight. It is possible to deactivate the hydrolytic condensation catalyst by neutralization before distillation. Even in this case, heating and concentration during distillation can cause condensation of functional groups to alter the functional group content, viscosity, and molecular weight distribution. It is thus difficult to avoid any influence on the properties of the resulting polyorgano. siloxane resin. The following reasons are presumed. Since pH control in proximity to a neutralization equivalent point is difficult, a significant change of pH can occur with a slightly excess or short amount of neutralizing agent. Since neutralization reaction in organic solvent often takes a long time, considerable amounts of acid and alkali are left unreacted.

SUMMARY OF THE INVENTION

Therefore, an object of the present invention is to provide a method for preparing a polyorganosiloxane resin by effecting hydrolytic condensation of an organoalkoxysilane and/or an oligomer thereof, which can remove the alcohol by-product without adversely affecting the properties of the end polyorganosiloxane resin.

The inventors have discovered that this and other objects can be achieved by adding a low volatile, weakly acidic compound to the reaction mixture resulting from the hydrolytic condensation of an organoalkoxysilane and/or an oligomer thereof for adjusting the reaction mixture to pH 2 to 5, and distilling off the alcohol by-product from the reaction mixture. Even during distillation, the pH of the reaction system is maintained in the range within which the polyorganosiloxane resin is stable, minimizing the influence of heating and concentration during distillation on the properties of the polyorganosiloxane resin.

More particularly, since the low volatile, weakly acidic compound is not distilled off during distillation of the alcohol by-product, the reaction system is maintained at pH 2 to 5. Within this pH range, silanol and alkoxy groups which are functional groups of the polyorganosiloxane resin are stable and do not undergo reaction under distillation conditions including heating and concentration. The polyorganosiloxane resin is no longer altered in functional. group content, viscosity, and molecular weight distribution or gelled.

Often it is desired to wash the polyorganosiloxane resin phase with water during the process. If water washing is carried out after removal of the alcohol by-product as mentioned above, it is possible to reduce or eliminate the alcohol content in the waste water, mitigating the load of waste water disposal. Often it is desired to concentrate or evaporate to dryness a polyorganosiloxane resin solution for adjusting its non-volatile content or obtaining a solid resin. In this case, the previous addition of a low volatile, weakly acidic compound to adjust the system to pH 2 to 5 will be effective for preventing the concentration or evaporation from altering the properties of polyorganosiloxane resin to a noticeable extent. The weakly acidic compound is also effective for improving the shelf stability of polyorganosiloxane resin or its solution. Additionally, this weakly acidic compound is low volatile so that it cannot be introduced into distilled fractions, eliminating the risk of attacking the apparatus.

Therefore, according to the present invention, there is provided a method for preparing a polyorganosiloxane resin, comprising the steps of effecting hydrolytic condensation of an organoalkoxy silane and/or an oligomer thereof, leaving a reaction mixture containing an alcohol by-product, adding a low volatile, weakly acidic compound to the reaction mixture for adjusting the reaction mixture to pH 2 to 5, and distilling off the alcohol by product from the reaction mixture.

DETAILED DESCRIPTION OF THE INVENTION

The method for preparing a polyorganosiloxane resin according to the present invention starts with an organoalkoxysilane and/or an oligomer thereof. Useful are organo alkoxysilanes of the following general formula (I) alone and mixtures thereof.

$$R_{n-4}Si(OR')_n \qquad (I)$$

In formula (I), R is an alkyl group having 1 to 15 carbon atoms such as methyl, ethyl, n-propyl, i-propyl, n-butyl, and i-butyl groups; an alkenyl group having 2 to 15 carbon atoms such as vinyl, 1-propenyl, and 2-propenyl groups; or an aryl group having 6 to 15 carbon atoms such as phenyl, tolyl, benzyl, and phenethyl groups; R' is an alkyl group having 1 to 5 carbon atoms such as methyl, ethyl, n-propyl, i-propyl, n-butyl, and i-butyl groups; and letter n is an integer of from 1 to 4.

Examples of the organoalkoxysilane include methyl orthosilicate, ethyl orthosilicate, methyltrimethoxysilane, ethyltrimethoxysilane, vinyltrimethoxysilane, phenyl trimethoxysilane, dimethyldimethoxysilane, diphenyl dimethoxysilane, vinylmethyldimethoxysilane, phenylmethyl dimethoxysilane, trimethylmethoxysilane, methyltriethoxy silane, and phenyltriethoxysilane.

The oligomers of organoalkoxysilanes include partially hydrolyzed condensates of organoalkoxysilanes, for example, methylpolysilicate, ethylpolysilicate, 1,2-dimethyltetramethoxydisiloxane, 1,2-diphenyltetramethoxydisiloxane, 1,2-dimethyltetraethoxydisiloxane, and 1,2-diphenyltetraethoxy disiloxane.

In the practice of the invention, an organohalogenosilane may be used as an additional reactant along with the organoalkoxysilane or oligomer thereof, if desired, in an amount of up to 20% by weight of the entire silane reactants.

The aforementioned organoalkoxysilane or oligomer thereof is subject to hydrolytic condensation to form a polyorganosiloxane resin, preferably in the presence of an acidic or alkaline hydrolytic condensation catalyst. The catalyst may be selected from well-known ones, for example, acids such as hydrochloric acid, hydrobromic acid, sulfuric acid, p-toluenesulfonic acid, trifluoroacetic acid, (trifluoro)methane sulfonic acid, and nitric acid; amines such as ethylenediamine, triethylamine, and tetraethyl ammonium hydroxide; and hydroxides of alkali and alkaline earth metals such as NaOH and KOH. Usually, acidic catalysts have a pH value of 2 or lower and alkaline catalysts have a pH value of 10 or higher. It will be understood that in the case of using an organohalogenosilane as an additional reactant, there is formed a hydrohalogenic acid by-product providing catalysis.

Hydrolytic condensation reaction may be conducted in a conventional manner. In general, the reactant which is an organoalkoxysilane or oligomer thereof is mixed and agitated with water in the presence of a catalyst. The molar amount of water is from 0.4 times to equal to the total moles of hydrolyzable groups (alkoxy and chloro). If desired, there may be used a solvent in which both the reactant and the resulting organopolysiloxane are soluble and which itself is inert to the reaction. When used, the amount of solvent is up to 3 times the weight of the silicon compound reactant. Exemplary solvents include toluene, xylene, acetone, methyl ethyl ketone, methanol, ethanol, and isopropanol. The hydrolysis temperature and time vary with the reactivity of Q the reactant and the desired property of the end product although ordinary conditions include a temperature of about 10° to 150° C. and a time of about 1 to 29 hours.

After the organoalkoxysilane and/or oligomer thereof has been subject to hydrolytic condensation as mentioned above, the reaction is terminated, if desired, by adding an alkali or acid to the reaction mixture for neutralizing the acidic or alkaline hydrolytic condensation catalyst At this point, the reaction mixture contains an alcohol by-product in addition to the end polyorganosiloxane resin. According to the present invention, a low volatile, weakly acidic compound is added to the reaction mixture for adjusting the reaction mixture to pH 2 to 5 before the alcohol by-product is distilled off from the reaction mixture. In a process for preparing a polyorganosiloxane resin of the type which requires a distillation step for removing the solvent, by-product, and unreacted reactants, the present invention is characterized by adding a low volatile, weakly acidic compound to the system for adjusting the system to pH 2 to 5 before the distillation step, thereby preventing or minimizing any alteration or gelation of the polyorganosiloxane resin during distillation. This means is especially effective for removing the alcohol by-product. The present invention permits for safe removal of the alcohol by-product by distillation which is otherwise impossible, especially in the case of end polyorganosiloxane resins mainly comprised of $CH_3SiO_{3/2}$ units which could be largely affected by and often gelled during the distillation step in the prior art process.

The weakly acidic compounds used herein should have such low volatility that they do not volatilize off during the distillation step. Exemplary are monocarboxylic acids having 3 to 10 carbon atoms such as butyric acid, valeric acid, caproic acid, and heptanoic acid; dicarboxylic acids having 2 to 10 carbon atoms such as oxalic acid, malonic acid, succinic acid, adipic acid, maleic acid, and fumaric acid; hydroxycarboxylic acids having 3 to 10 carbon atoms such as lactic acid, tartaric acid, malic acid, and citric acid; and aromatic carboxylic acids having 7 to 15 carbon atoms such as benzoic acid, phthalic acid, cinnamic acid, and salicylic acid.

As previously mentioned, acids and alkalis are often used as the hydrolytic condensation catalyst. Where the acid catalyst is used in the condensation step, a compound capable of reacting with the acid to form a weakly acidic compound may be used in the pH adjusting step. Such compounds are salts of the above-mentioned carboxylic acids, which can also serve as neutralizing agents for terminating the hydrolytic condensation reaction In the case of alkali catalysts, the above-mentioned carboxylic acids as such can be neutralizing agents too.

In either case, the use of another neutralizing agent is acceptable. The requirement is that the amounts of catalyst, neutralizing agent, if any, and weakly acidic compound used should be determined such that the weakly acidic compound is left in a sufficient amount to keep the system at pH 2 to 5. In an example of adding a carboxylic acid salt also serving as a neutralizing agent to a system containing an acid catalyst, the salt is preferably used in an amount equal to the neutralization equivalent or slightly in excess thereof. The excess of carboxylic salt is effective for stabilizing the pH of the system since it provides buffer action together with the resulting carboxylic acid. However, a large excess of carboxylic salt is not recommended because of increased pH. In another example of using a carboxylic acid and another neutralizing agent, preferably the neutralizing agent is used in excess of the neutralization equivalent of the acid catalyst and the carboxylic acid is used in excess of the neutralization equivalent of the excess neutralizing agent.

In turn, in the case of alkali catalyst, a carboxylic acid also serving as a neutralizing agent, for example, is preferably used in excess of the neutralization equivalent of the alkali catalyst, for example, about twice the neutralization equivalent, though the amount varies with a particular type of alkali catalyst, whereby the system is kept at pH 2 to 5. Where the alkali catalyst is neutralized with a strong acid or similar neutralizing agent and a carboxylic acid is separately used for pH adjustment, an effective approach is to use the neutralizing agent in short of the neutralization equivalent of the alkali catalyst and to neutralize the remainder of the alkali catalyst with an excess of the carboxylic acid. Moreover, the use of alkali catalysts has the likelihood that there be formed ≡SiOM wherein M is an alkali or alkaline earth metal such as Li, Na and K, and if this is left in the system, it would adversely affect the properties of the end polyorgano siloxane resin. Then a strong acid or similar neutralizing agent may be used in excess of the neutralization equivalent for reducing the residual amount of ≡SiOM. The same as in the neutralization of the acid catalyst applies in this case.

As understood from the above illustrative examples, the amount of a low volatile, weakly acidic compound used largely varies with the mode of addition. It is preferred that the weakly acidic compound is left in the reaction mixture in an amount of about 50 ppm or higher, especially about 50 to about 5000 ppm. Less than about 50 ppm of weakly acidic compound would be too small to provide stable pH to the system. No upper limit is imposed on the residual amount of weakly acidic compound although the preferred upper limit is about 5000 ppm because no further benefits are available beyond 5000 ppm.

The thus pH adjusted reaction mixture liquid is then distilled whereby a partial or entire amount of the alcohol by-product is evaporated off. Distillation may take place either under atmospheric pressure or vacuum. Any of conventional distillation techniques may be used. If the polyorganosiloxane resin is sensitive to heating or concentration, it will be effective to carry out distillation in vacuum at as low temperatures as possible or to add a suitable solvent to avoid concentration.

At the end of distillation, the weakly acidic compound left in the system may be removed by water washing in most cases. However, since the weakly acidic compound left in the system can improve the shelf stability of polyorgano siloxane resin, removal of the compound is unnecessary in some applications where it is not detrimental to the required performance.

Understandably, the polyorganosiloxane resin may be recovered from the reaction mixture after distillation by conventional techniques.

There has been described a method for preparing a polyorganosiloxane resin through the hydrolytic condensation of an organoalkoxysilane and/or an oligomer thereof wherein the alcohol by-product can be readily removed from the reaction mixture without altering the polyorganosiloxane resin. It is thus possible to reduce or eliminate the alcohol content in the waste water, improving the cost and operation of waste water disposal and minimizing environmental pollution.

EXAMPLE

Examples of the present invention are given below by way of illustration and not by way of limitation.

Example 1

A 1-liter flask was charged with 136 grams (1 mol) of methyltrimethoxysilane, 48 grams (0.4 mol) of dimethyl dimethoxysilane, 79 grams (0.4 mol) of phenyltrimethoxy silane, 25 grams (0.1 mol) of diphenyldichlorosilane, and 400 grams of toluene. With stirring at 60° C., 90 grams (5 mol) of water was added dropwise over 30 minutes, and the reaction mixture was then aged for one hour at 60° C. Subsequent steps included cooling to 30° C., adding 18.5 grams (0.22 mol) of NaHCO$_3$, stirring for 3 hours at 30° C., adding 4.1 grams (0.04 mol) of valeric acid, and stirring for a further one hour at 30° C. The system was approximately at pH 4 at this point. Then an ester adaptor was attached to the flask whereupon distillation was carried out up to 90° C. under atmospheric pressure There was distilled out 302 grams of a fraction which consisted of 152 grams of methanol, 110 grams of toluene, and 40 grams of water, indicating that 95% by weight of the methanol by-product was removed. The residue was washed with water, dried over anhydrous Na$_2$SO$_4$, filtered, and concentrated by vacuum distillation to a non-volatile content of 50% by weight.

The thus obtained polyorganosiloxane resin solution had a viscosity of 18.2 cs (centistoke) and a silanol group content of 0.23 mol/100 grams of the resin.

COMPARATIVE EXAMPLE 1

Using the same reactants and conditions as in Example 1, a reaction mixture was hydrolyzed and aged. With the steps of adding NaHCO$_3$ and valeric acid and distillation omitted, this reaction mixture was washed with water. Thereafter, by following the procedure of Example 1, there was obtained a polyorganosiloxane resin solution.

This polyorganosiloxane resin solution had a viscosity of 17.5 cs and a silanol group content of 0.25 mol/100 grams of the resin. The waste water resulting from the water washing step contained approximately the entire amount of methanol by-product.

COMPARATIVE EXAMPLE 2

The procedure of Example 1 was repeated except that the addition of valeric acid was omitted. The polyorgano siloxane resin solution had a viscosity of 43.9 cs and a silanol group content of 0.11 mol/100 grams of the resin. The resin having a high viscosity and a low silanol content was undesirable.

EXAMPLE 2

A 1-liter flask was charged with 356 grams (2 mol) of methyltriethoxysilane, 36 grams (0.3 mol) of dimethyl dimethoxysilane, and 389 grams of toluene. With stirring at 20° C., 35% hydrochloric acid containing 5 grams (0.048 mol) of HCl was added over 10 minutes and 86 grams (4.8 mol) of water was then added dropwise over 20 minutes for hydrolysis at 20° C. The reaction mixture was aged for one hour at 20° C. After 7.8 grams (0.04 mol) of sodium tartrate was added to the mixture, stirring was continued for 3 hours at 30° C. The system was approximately at pH 4 at this point. Then an ester adaptor was attached to the flask whereupon distillation was carried out up to 90° C. under atmospheric pressure. There was distilled out 431 grams of a fraction which consisted of 18 grams of methanol, 188 grams of ethanol, 200 grams of toluene, and 25 grams of water, indicating the removal of 70% by weight of the methanol by-product. The residue was washed with water, dried over anhydrous Na$_2$SO$_4$, filtered, combined with 0.02 grams (0.0001 mol) of tartaric acid, and concentrated by vacuum distillation to a non-volatile content of 50% by weight.

The thus obtained polyorganosiloxane resin solution had a viscosity of 9.3 cs and a silanol group content of 0.30 mol/100 grams of the resin.

A 100-g portion of the polyorganosiloxane resin solution was placed in a glass container which was sealed and allowed to stand for several months at 40° C. for examining a change of viscosity. The solution viscosity was 9.5 cs at 1 month, 10.2 cs at 2 months, 12.8 cs at 3 months, and 13.0 cs at 4 months. The solution was regarded highly stable. This is attributable to the addition of a weakly acidic compound (tartaric acid) before vacuum distillation.

COMPARATIVE EXAMPLE 3

The procedure of Example 2 was repeated except that 4.2 grams (0.05 mol) of NaHCO₃ was used instead of sodium tartrate. The reaction mixture gelled during distillation under atmospheric pressure.

EXAMPLE 3

The procedure of Example 2 was repeated except that the addition of tartaric acid before vacuum distillation was omitted. The polyorganosiloxane resin solution had a viscosity of 10.1 cs and a silanol group content of 0.27 mol/100 grams of the resin.

EXAMPLE 4

A 1-liter flask was charged with 226 grams (1 mol) of an oligomer of methyltriethoxysilane having an average degree of polymerization 2 and represented by the formula:

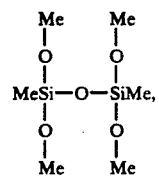

48 grams (0.4 mol) of dimethyldimethoxysilane, 437 grams of toluene, and 0.1 gram (0.002 mol) of KOH. With stirring at 30° C., 45 grams (2.5 mol) of water was added dropwise over 30 minutes. The reaction mixture was aged for one hour at 30° C. After 0.13 grams (0.002 mol) of oxalic acid was added to the mixture, stirring was continued for 3 hours at 30° C. The system was approximately at pH 3 at this point. Then an ester adaptor was attached to the flask whereupon distillation was carried out up to 90° C. under atmospheric pressure. There was distilled out 320 grams of a fraction which consisted of 150 grams of methanol, 168 grams of toluene, and 2 grams of water, indicating the removal of 97% by weight of the methanol by-product. The residue was washed with water, dried over anhydrous Na₂SO₄, filtered, and concentrated by vacuum distillation to a non-volatile content of 50% by weight.

The thus obtained polyorganosiloxane resin solution had a viscosity of 28.3 cs and a silanol group content of 0.10 mol/100 grams of the resin.

COMPARATIVE EXAMPLE 4

The procedure of Example 4 was repeated except that 0.2 grams (0.002 mol) of sulfuric acid was used instead of the oxalic acid and the atmospheric distillation was omitted The polyorganosiloxane resin solution had a viscosity of 26.8 cs and a silanol group content of 0.12 mol/100 grams of the resin. The waste water resulting from the water washing step contained approximately the entire amount of methanol by-product.

Although some preferred embodiments have been described, many modifications and variations may be made thereto in the light of the above teachings. It is therefore to be understood that within the scope of the appended claims, the invention may be practiced otherwise than as specifically described.

We claim:

1. A method for preparing a polyorganosiloxane resin, and removing by-product alcohol therefrom, comprising the steps of
    effecting hydrolytic condensation of an organoalkoxysilane and/or an oligomer thereof, the reaction mixture resulting from the hydrolytic condensation step containing an alcohol by product,
    adding a lowly volatile, weakly acidic compound to the reaction mixture for adjusting the reaction mixture to pH 2 to 5, and
    distilling off the alcohol by-product from the reaction mixture.

2. The method of claim 1 wherein the organoalkoxysilane is one having the general formula (I):

$$R_{n-4}Si(OR')_n \qquad (I)$$

wherein
    R is an alkyl group having 1 to 15 carbon atoms, an alkenyl group having 2 to 15 carbon atoms, or an aryl group having 6 to 15 carbon atoms,
    R' is an alkyl group having 1 to 5 carbon atoms; and letter n is an integer of from 1 to 4.

3. The method of claim 1 wherein the low volatile, weakly acidic compound is selected from the group consisting of monocarboxylic acids having 3 to 10 carbon atoms, dicarboxylic acids having 2 to 10 carbon atoms, hydroxycarboxylic acids having 3 to 10 carbon atoms, and aromatic carboxylic acids having 7 to 15 carbon atoms.

4. The method of claim 1 wherein the low volatile, weakly acidic compound is present in the reaction mixture in an amount of about 50 to about 5000 ppm.

5. A method of claim 2 wherein the lowly volatile, weakly acidic compound is selected from a monocarboxylic acid having 3 to 10 carbon atoms, a dicarboxylic acid having 2 to 10 carbon atoms, a hydroxycarboxylic acid having 3 to 10 carbon atoms, or an aromatic carboxylic acid having 7 to 15 carbon atoms,
    wherein the low volatile, weakly acidic compound is present in the reaction mixture in an amount of about 50 to about 5000 ppm.

* * * * *